(No Model.) 2 Sheets—Sheet 1.
G. H. ALBEE.
MACHINE FOR MAKING HEADS OF CASKS, &c.
No. 300,336. Patented June 17, 1884.
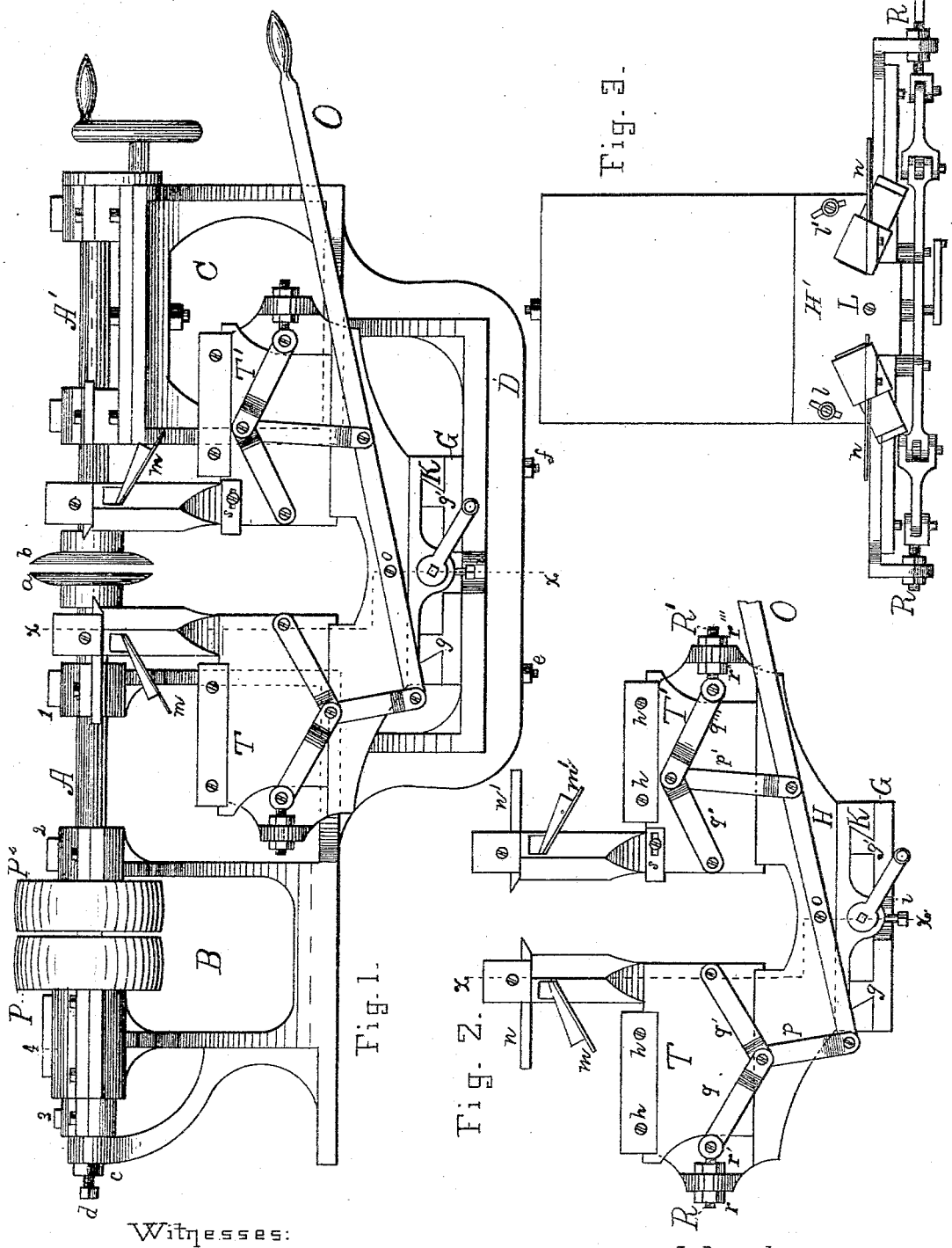

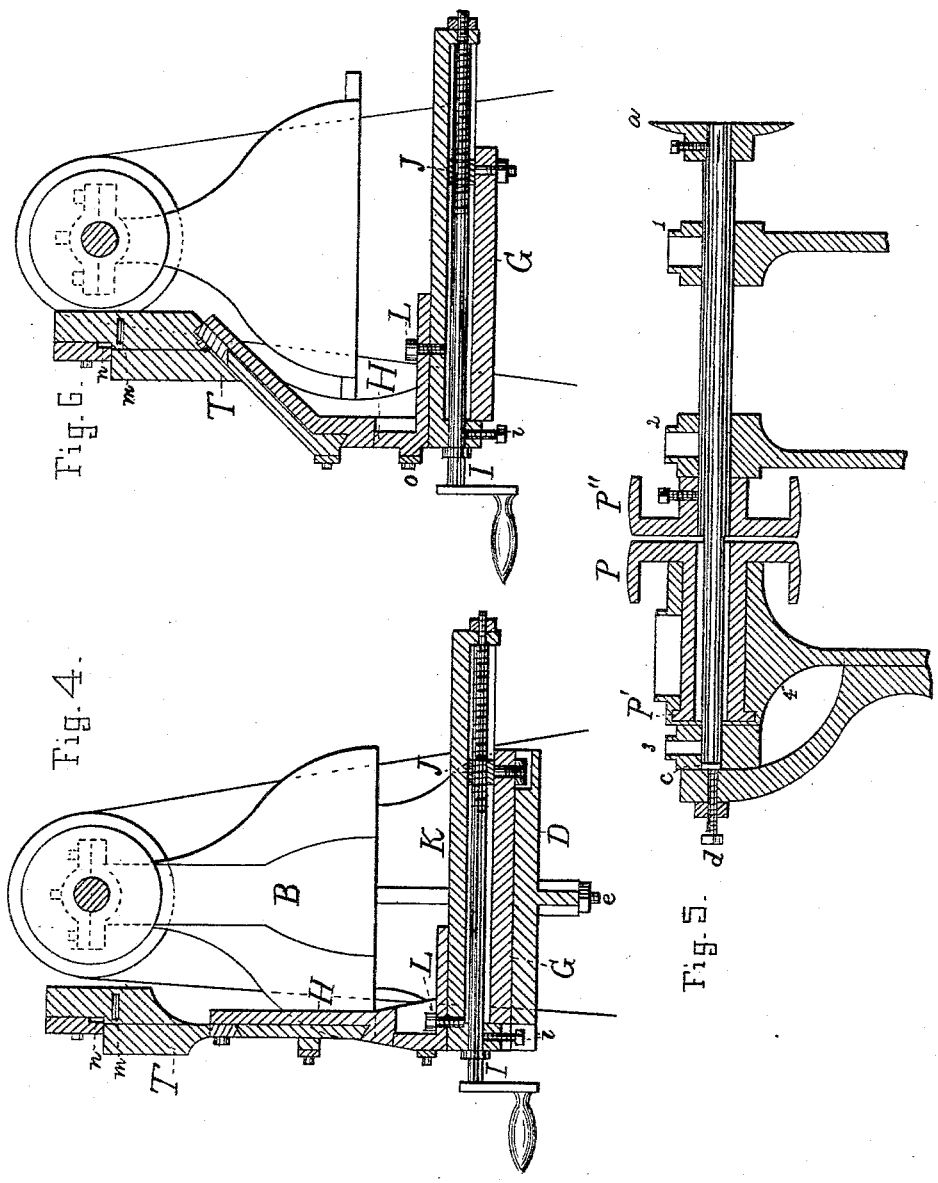

UNITED STATES PATENT OFFICE.

GEORGE H. ALBEE, OF NEENAH, WISCONSIN.

MACHINE FOR MAKING HEADS OF CASKS, &c.

SPECIFICATION forming part of Letters Patent No. 300,336, dated June 17, 1884.

Application filed October 24, 1882. (No model.)

*To all whom it may concern:*

Be it known that I, G. H. ALBEE, a citizen of the United States, residing at Neenah, in the county of Winnebago and State of Wisconsin, have invented a new and useful Machine for Making Heads of Casks and Bottoms of Pails, Tubs, &c., of which the following is a specification.

My invention relates to improvements in lathes for cutting and chamfering, rabbeting, rounding, and making beads and moldings upon bottoms, covers, heading, &c., of pails, tubs, kegs, and other articles of wooden ware, which are produced by being clamped between rapidly-revolving flanges and cut to the size required, and formed by cutting-tools held to their sides.

The objects of my improvement are, first, to provide a method of holding the piece to be cut firmly while it is revolved in a plane at right angles to the clamping-spindles, thus reducing the friction of the revolving parts to the minimum; second, to provide a loose pulley for a bottom or heading lathe that will run easily and firmly in its position without possibility of wearing out of balance, and thereby causing a continual jar to the lathe; third, to afford facilities whereby the angle at which the cutting-tools is presented to the piece being operated upon can be changed in relation to the vertical plane of the lathe-spindle from a right to an acute or obtuse angle; fourth, to provide a method of applying the cutting-tools to the work required in a firm and expeditious manner without the jar and consequent inaccuracy incident to tools held in the hand or in swinging tool-holders. I attain these objects by the mechanism illustrated in the accompanying drawings, in which—

Figure 1 represents an elevation of the lathe as seen from its front. Fig. 2 is a front elevation of the cutting mechanism detached from the lathe. Fig. 3 is a plan thereof. Fig. 4 is a vertical section of the cutting mechanism on the line $x\,x$ of Figs. 1 and 2. Fig. 5 is a longitudinal section of the live-spindle in its bearings, with its tight or driving and loose pulleys. Fig. 6 is a vertical section of the cutting mechanism on the line $x\,x$ of Figs. 1 and 2, adapted to be used on the usual style of lathes.

Similar letters of reference indicate corresponding parts in the several views.

The frame of the lathe, consisting of the head-block B, carrying the live-spindle A, tail-block C, carrying the tail-spindle A', and depressed platform D, to which the cutting mechanism is attached, are constructed of a single casting, thus forming a rigid support for all parts of the lathe, and one in which the tail-spindle, when properly adjusted in an exact plane with the live-spindle, is not liable to be thrown therefrom by the continual strain incident to the process of clamping the pieces to be cut between the flanges $a\,b$. By constructing them in this improved method they are found to be always in line, running free of noise and unnecessary friction, revolving the pieces secured between the flanges $a\,b$ truly and firmly, with less liability to split when revolving.

The live-spindle A revolves in its bearings 1 2, and passes loosely through the loose pulley P and its shaft P', its diameter reduced to about one-eighth of an inch less than the bore of said pulley, to the bearing 3, where its hardened end bears against a removable plate, $c$. The tight pulley P'' serves as a collar to prevent any longitudinal movement to the spindle A, the set-screw and pinch-nut $d$ keeping the plate $c$ in contact with the end of the spindle as it becomes worn. The loose pulley P, with its journal P', rests in an independent bearing, 4, through which the spindle passes, as above described, and, possessing facilities for continual lubrication, does not wear loose like an ordinary loose pulley and by the enlargement of its bore become unbalanced, but revolves freely and noiselessly in its own bearing.

Attached to the depressed platform D by bolts $e\,f$, which pass through slots in said platform, is the tool-stock-holder bed-piece G. These bolts $e\,f$ can be moved to the right or left in their slots in the platform for adjustment of the bed-piece, and the cutting mechanism carried by it, in their relation to the piece being operated upon and held between the flanges $a\,b$. The tool-stock holder H is cast separately from the sliding table K, and secured to it by bolts $l\,l'$. It is pivoted on the bolt L, upon which it revolves, said pivotal point being located at the base of a vertical plane, passing in a longitudinal direction through the tools n n, and in a transverse direction through the piece held between the flanges a b, the base of the tool-stock holder being a plane at right angles with the aforesaid vertical planes. By virtue of this construction the holder may be revolved upon its pivotal point, thereby changing the angle at which the tools n n' are presented to the piece being cut, but not materially the relation which they bear to its diameter or the position of the tools n n in the plane in which the piece held between the flanges a b revolves, thus forming its periphery of the piece of such an angle as may be desired to fit the inside of a pail or other tapering article. The holes for the bolts l l' are slotted to allow the desired angle to be produced.

By reference to Fig. 1 it will be seen that the bed-piece G is secured to the platform D of the lathe. Upon it are ways g g', upon which is fitted to slide the table K, to which is attached the cutting mechanism. A screw, I, passes through lugs upon K, and a nut, J, which is secured to G. By applying a crank to the outer extremity of the screw-shaft I the sliding table K, and with it the cutting-tools, are moved nearer to or farther from the center of the lathe-spindles for producing an article of the desired diameter.

i is a set-screw for securing the sliding table from being moved by accidental causes.

The tool-stock holder H may be secured to the platform D and adjusted thereon for cutting material of various diameter. It may be secured thereto by bolts, or in any convenient manner, thereby dispensing with the bed-piece G, the sliding table K, and its adjusting mechanism. Their use is preferred where many pieces of varying diameter are required to be cut, the accurate adjustment therefor being more rapid and convenient.

The cutting-off tools n n' and chamfering-tools m m' in both the tool-stocks T and T' are operated simultaneously by means of the lever O, which is pivoted at o, links p p', and knuckle-joint levers q q' q'' q'''. By depressing the handle of the lever O the tool-stocks T T' are moved toward the revolving piece, cutting it to a circular form, and chamfering both of its sides with a single motion of the hand.

The spade-handle bolts R R', with the nuts r r' r'' r''', by which they are secured to the casting of the tool-stock holder, afford a quick and accurate method of adjusting the throw of the knuckle-joint levers, giving more or less chamfer to either side of a piece of heading to fit it to a wide or narrow crozing or other purpose, as may be desired.

The sliding tool-stocks may be moved simultaneously to and from each other by means of a right-and-left hand screw located parallel with their line of motion, and connecting with them, or by various mechanical devices; but I prefer the one illustrated, as being the most simple in construction and operation.

s is a stop whereby the forward movement of the tool-stocks T T' may be limited. The pieces to be cut are held between the flanges a b, by moving the spindle of the tail-block longitudinally toward the head-block by means of a screw, eccentric lever, or other device, that shown in the drawings being no part of my present invention. The flange a should have numerous spurs projecting from its inner face, which enter the wood of the article to be cut and assist in retaining it in its position.

In applying the cutting mechanism to my improved lathes, I form the tool-stocks T T' and their holder H, so that they occupy a nearly perpendicular position, and construct the head and tail blocks of the lathe of the requisite form to allow the cutting-tools to be operated at such distance from the spindles as will produce an article of as small diameter as desired; but in applying them to lathes of the usual form, having head and tail blocks with a wide base, it is necessary to incline them toward the spindles. The former is shown in Fig. 4, the latter in Fig. 6.

The tool stock and holder may be inclined at any angle requisite to produce the desired result. Either of the tool-stocks may be of such form as will best retain the desired form of tools, and such tools inserted in the tool-stocks or tool-stock in the tool-stock holder as occasion requires for chamfering, rounding, rabbeting, grooving, or molding.

In constructing the tool-holding, adjusting, and operating mechanism, when a beveled or angular form of the periphery of the articles to be cut by it is not required, except such as is produced by the chamfering-knives m m, the tool-stock holder H and the sliding table K are cast in a single piece, thereby lessening the number of pieces entering into their composition and the labor required in adjusting the same in their respective places.

Articles of various diameters are produced by the operation of the screw I and nut J, combined with the tool-stock holder H and bed-piece G, without the intervention of the additional piece, the sliding table K.

The operation of the lathe is as follows: The square piece of board is secured between the flanges a b, as above described. The belt is shifted from the loose to the tight pulley, when the piece is revolved at a circumferential speed at the cutting-point of about five thousand feet per minute. The handle O is depressed, bringing the tools n n' in contact with the board, cutting it to a circular form, when the knives m m' engage it and finish it to the desired form. The handle O is then raised, a piece of sand-paper may be applied, polishing it, and stopping it as the belt is shifted to the loose pulley, the piece removed, another inserted, and the operation repeated.

The loose pulley P, revolving upon its journal P' in the bearing 4, as above described, is not made the subject of a claim in this application, as I am about to file a separate application for that portion of the invention.

I am aware that the simultaneous cutting of both sides of a pail or tub bottom, barrel or keg heading, cover, or similar article has long been practiced. I do not therefore claim this as new. Neither do I claim as new the sliding table K, operated by the screw I and nut J; but What I do claim as new, and desire to secure by Letters Patent, is—

1. In a lathe for cutting bottoms, covers, and heading for wooden ware and cooperage, the tool-stock holder H, having tool-stocks T T' sliding therein in the same vertical and horizontal plane, said tool-stocks containing the tools $n$ $n'$ for cutting off, and the tools $m$ $m'$ for chamfering, rabbeting, rounding, grooving, or molding, the tool-stock T being connected to the tool-stock holder H by the knuckle-joint levers $q$ $q'$ and the tool-stock T' by the knuckle-joint levers $q''$ $q'''$, and advanced toward and receded from each other simultaneously by the action of the lever O upon the knuckle-joint levers aforesaid, the lever O being fulcrumed upon the tool-stock holder H and connected to the pins of the knuckle-joints by the links $p$ $p'$, and in combination therewith the stop $s$, whereby the forward movement of the tool-stocks T and T' are governed and the depth of cut of the cutters $m$ $m'$ upon the piece being formed gaged as desired, substantially as described.

2. In a lathe for cutting bottoms, covers, and heading for wooden ware and cooperage, the tool-stock-holder H, having tool-stocks T T' sliding therein in the same vertical and horizontal plane, said tool-stocks having tools for cutting off, chamfering, rabbeting, rounding, grooving, or molding, and being connected to the tool-stock holder H by the knuckle-joint levers $q$ $q'$ and $q''$ $q'''$, one end of each pair being connected therewith by a pin or bolt, and the opposite end with the tool-stock holder H by means of the spade-handle bolts R and R' and the adjusting and retaining nuts $r$ $r'$ and $r''$ $r'''$, the tool-stocks being simultaneously moved toward and from each other by the action upon the knuckle-joint levers aforesaid of the lever O, the lever O being fulcrumed on the tool-stock holder and connected to the pin of the knuckle-joint by the links $p$ $p'$, substantially as described and shown.

3. The combination, in a lathe for cutting bottoms, covers, and heading for wooden ware and cooperage, of a tool-stock holder having tool-stocks sliding therein in the same vertical and horizontal plane, and having mechanism for their simultaneous movement toward and from each other, consisting of the knuckle-joint levers $q$ $q'$, connecting one and $q''$ $q'''$ the other of said tool-stocks with the holder aforesaid, and the links $p$ and $p'$, connecting the pins of the knuckle-joint in said levers, respectively, with the lever O, which is fulcrumed upon the aforesaid holder, the tool-stocks having tools for cutting off, chamfering, rounding, rabbeting, grooving, or molding, and the tool-stock holder means for its adjustment horizontally, both parallel with and in a transverse direction to the axial line of the flanges $a$ and $b$, between which flanges is secured, and with which is rotated the article to be cut, whereby the position of said tool-stock holder, its tool-stocks and their cutting-tools, can be adjusted in the position required relative to the aforesaid flanges for the production of articles differing from each other in their diameter, substantially as described.

4. In a lathe for cutting bottoms, covers, and heading of wooden ware and cooperage, the adjustable tool-stock holder H, having tool-stocks T T' sliding therein in the same vertical and horizontal plane, and having also mechanism for their simultaneous movement toward and from each other, the tool-stocks having cutting-tools therein, and in combination therewith the bed-piece G, suitably located and secured in a horizontal plane, its longitude being parallel with the plane of rotation of the flanges $a$ and $b$, the screw I, nut J, and sliding table K, the screw I and nut J operating to adjust the sliding table K longitudinally upon the bed-piece G, said table having upon it the pivotal point L, upon which is pivoted the tool-stock holder H, and around which point it is adjustable within determined limits, and having also means for securing it therein, said pivotal point being located at the base of a vertical plane passing in a longitudinal direction through the cutting-off tools $n$ $n'$, and in a transverse direction through the piece to be cut, and which is held between the flanges $a$ and $b$, the base of the tool-stock holder being a plane at right angles with the aforesaid vertical planes, whereby its partial revolution around said point within established limits, while presenting the cutting-off tools $n$ $n'$ to the piece to be cut at an acute or obtuse angle, does not materially affect the diameter of said piece or the point of connection of the tools $n$ $n'$ in the plane in which said piece is revolving, and thereby producing articles having their external circumference forming a bevel with their plane of rotation, substantially as set forth.

GEORGE H. ALBEE.

Witnesses:
FRANK McKILLIP,
MYRON COOKE.